(12) United States Patent
Maeda

(10) Patent No.: US 7,802,555 B2
(45) Date of Patent: Sep. 28, 2010

(54) INTAKE CONTROL DEVICE FOR AN ENGINE

(75) Inventor: Hiroyuki Maeda, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 33 days.

(21) Appl. No.: 12/050,457

(22) Filed: Mar. 18, 2008

(65) Prior Publication Data
US 2009/0235890 A1 Sep. 24, 2009

(51) Int. Cl.
F02B 31/04 (2006.01)
(52) U.S. Cl. .................................................. 123/306
(58) Field of Classification Search .............. 123/302, 123/306, 308, 184.53, 184.56, 337
See application file for complete search history.

(56) References Cited

U.S. PATENT DOCUMENTS

| 4,543,931 | A | 10/1985 | Hitomi et al. | |
| 5,632,244 | A | 5/1997 | Endres et al. | |
| 6,499,456 | B1 * | 12/2002 | Nogi et al. | 123/295 |
| 6,874,465 | B2 * | 4/2005 | Arimatsu et al. | 123/306 |
| 6,904,891 | B2 * | 6/2005 | Tominaga et al. | 123/302 |
| 6,918,372 | B2 * | 7/2005 | Nishii et al. | 123/306 |
| 7,032,560 | B2 * | 4/2006 | Katou et al. | 123/193.5 |
| 7,051,702 | B2 * | 5/2006 | Sakai et al. | 123/308 |
| 7,128,050 | B1 * | 10/2006 | Abe | 123/306 |
| 7,198,026 | B2 * | 4/2007 | Masuta et al. | 123/308 |
| 2010/0059016 | A1 * | 3/2010 | Tachibana et al. | 123/307 |

FOREIGN PATENT DOCUMENTS

| JP | 2001-263067 | * | 9/2001 |
| JP | 2003-239751 | A | 8/2003 |
| JP | 2003-278551 | A | 10/2003 |
| JP | 2006-328983 | * | 12/2006 |
| JP | 2007-327487 | * | 12/2007 |
| JP | 2008-75509 | * | 4/2008 |
| WO | 2007/132311 | A2 | 11/2007 |

OTHER PUBLICATIONS

Official communication issued in counterpart European Application No. 08004487.8, mailed on Aug. 29, 2008.

* cited by examiner

Primary Examiner—Hai H Huynh
(74) Attorney, Agent, or Firm—Keating & Bennett, LLP

(57) ABSTRACT

In an intake control device, upper and lower partition plates are provided in an intake passage extending obliquely upward from a combustion chamber as seen in an axial direction of a crankshaft. The partition plates divide the intake passage into upper intake passages and lower intake passages. A tumble control valve is arranged in an upstream vicinity of the partition plate in the intake passage. The tumble control valve opens or closes the upper intake passage. A bottom wall, which is a portion of a wall around an inlet of the lower intake passage and positioned on the side opposite to the upstream partition plate, is inclined to be gradually separated from the upstream partition plate as it extends upward.

5 Claims, 6 Drawing Sheets

INTAKE CONTROL DEVICE FOR AN ENGINE

BACKGROUND OF THE INVENTION

1. Field of the Invention

The present invention relates to an intake control device for an engine for generating a tumbling flow of intake air in a cylinder.

2. Description of the Related Art

A conventional intake control device for an engine is disclosed in JP-A-2003-239751 (Patent Document 1) and JP-A-2003-278551 (Patent Document 2), for example. The intake control device for the engine disclosed in Patent Documents 1 and 2 includes a partition plate for partitioning an intake passage in an engine into an upper intake passage and a lower intake passage as seen along an axial direction of a crankshaft, and a tumble control valve provided in a vicinity of an upstream portion of the partition plate for opening or closing the lower intake passage.

The intake control device disclosed in Patent Document 1 includes a flow straightening member for regulating a flowing direction of intake air while being linked with the tumble control valve. The flow straightening member defines both side walls of a downstream end of the upper intake passage. The flow straightening member is in a position spaced from an intake valve in the upstream direction when the tumble control valve is open, and moves to a position adjacent to the intake valve when the tumble control valve is closed.

The flow straightening member approaches the intake valve, thereby intake air gathers in an area around the center of a combustion chamber, and thus a tumbling flow of the intake air is facilitated.

A function for changing a flowing direction of intake air for facilitating a tumbling flow as described above is achieved by the partition plate approaching toward the intake valve in the intake control device disclosed in Patent Document 2. The partition plate of the intake control device disclosed in Patent Document 2 is movably arranged in a cylinder head along the intake passage, and makes a parallel displacement linked with the opening or closing of the tumble control valve.

In the intake control devices disclosed in Patent Documents 1 and 2, when the tumble control valve is closed, intake air mainly flows in the upper intake passage. Consequently, in the intake control device, a flowing direction of intake air is regulated because of displacements of the flow straightening member and the partition plate toward the intake valve. As a result, in an engine including the intake control device disclosed in Patent Documents 1 and 2, a tumbling flow is generated in the cylinder because of intake air flowing from the upper intake passage into the cylinder. A tumbling flow means a whirling flow of intake air which is whirling around the center line extending in a direction intersecting with the axial line of the cylinder.

There is a limit to further generating an effective tumbling flow with the conventional intake control devices described above. It is believed that the limit occurs because when the tumble control valve is closed, drag of intake air becomes large and the flow coefficient largely decreases.

Also, the conventional intake control devices have to include a movable flow straightening member and a partition plate to facilitate a tumbling flow, and thus its construction is complicated.

SUMMARY OF THE INVENTION

In order to overcome the problems described above, preferred embodiments of the present invention provide an intake control device for an engine, in which a further effective tumbling flow is generated in the cylinder with a simple construction.

According to a preferred embodiment of the present invention, the intake control device for an engine preferably includes a partition plate provided in an intake passage extending obliquely upward from a combustion chamber as seen along the axial direction of a crankshaft for dividing the intake passage into an upper intake passage and a lower intake passage, and a tumble control valve provided in a vicinity of an upstream portion of the partitioning plate in the intake passage for opening or closing a portion of the intake passage. The tumble control valve opens or closes the intake passage upstream of the partition plate, and a bottom wall, which is a portion of a wall defining a portion around an inlet of the lower intake passage and positioned on the side opposite to the partition plate, is inclined to be gradually separated from the partition plate as it extends to a more upstream portion.

According to a preferred embodiment of the present invention, the partition plate is preferably inclined such that an extension line from the partition plate toward the combustion chamber passes between the center of a lower surface of a valve disc of an intake valve and an edge of the lower surface of the valve disc which is positioned close to the center of the combustion chamber.

According to a preferred embodiment of the present invention, when the tumble control valve is closed, intake air flows only into the intake passage below the partition plate. The bottom wall around the inlet of the lower intake passage is preferably inclined to be separated from the partition plate as it extends to the more upstream portion, and thus the inlet is wide and an inflow of intake air is facilitated.

The intake air flowing near the bottom wall hits the bottom wall, thereby changing its flowing direction and the intake air flows toward the partition plate. At this point, the bottom wall arranged near the inlet of the lower intake passage substantially functions as an air funnel. Therefore, with the intake control device according to the various preferred embodiments of the present invention, although the partition plate is arranged in the intake passage, a flow coefficient of intake air in a state that the tumble control valve is closed becomes larger than the conventional intake control device.

Consequently, in the intake control device, when the tumble control valve is closed, a large amount of intake air can flow along the partition plate around the partition plate in the lower intake passage. The intake air passes between an exit of the intake passage and the intake valve as seen along the axial direction of the crankshaft and flows obliquely into the cylinder while the intake air concentrates around the partition plate as described above. In other words, a large amount of intake air flows around the center portion of the intake passage defined by the upper and lower intake passages.

That is, without using a moving flow straightening member linked with the tumble control valve, intake air can be delivered into the cylinder such that it passes through the center of the combustion chamber as seen along the axial direction of the cylinder.

The intake air flows obliquely into the cylinder such that it gathers around the axis of the cylinder as described above, and thereby a further tumbling flow is effective for combustion generated in the cylinder. An effective tumbling flow is a tumbling flow such that a whirling of intake air remains through an end period of a compression stroke.

When a strong tumbling flow is generated in the cylinder, a fuel-air mixture intensively flows in the combustion chamber at a point in the end period of a compression stroke and just before ignition thereby improving the conditions for combustion.

Additionally, if the tumble control valve is opened, a large amount of intake air flows into the cylinder through both the upper and lower intake passages, and a large output can be obtained from the engine.

Therefore, in an engine including the intake control device according to the various preferred embodiments of the present invention, an effecting tumbling flow is generated for combustion by closing the tumble control valve as described above, and thereby fuel efficiency can be improved and generation of harmful substances can be minimized. Also, the engine can have a high speed and a high output by opening the tumble control valve.

According to a preferred embodiment of the present invention, intake air preferably flows into the cylinder through the lower intake passage in a state that the tumble control valve is closed. Thereby, a portion of the intake air, which hits the valve disc of the intake valve, flows in a direction opposite to the intake passage as seen along the axial direction of the crankshaft. Therefore, the intake air hits the valve disc of the intake valve, whereby intake air is prevented from flowing in a direction in which a tumbling flow is weakened, and thus a further effective tumbling flow can be generated.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the intake control device for an engine according to the present invention will be described in detail hereinafter with reference to FIGS. 1 through 7.

Figure 1:
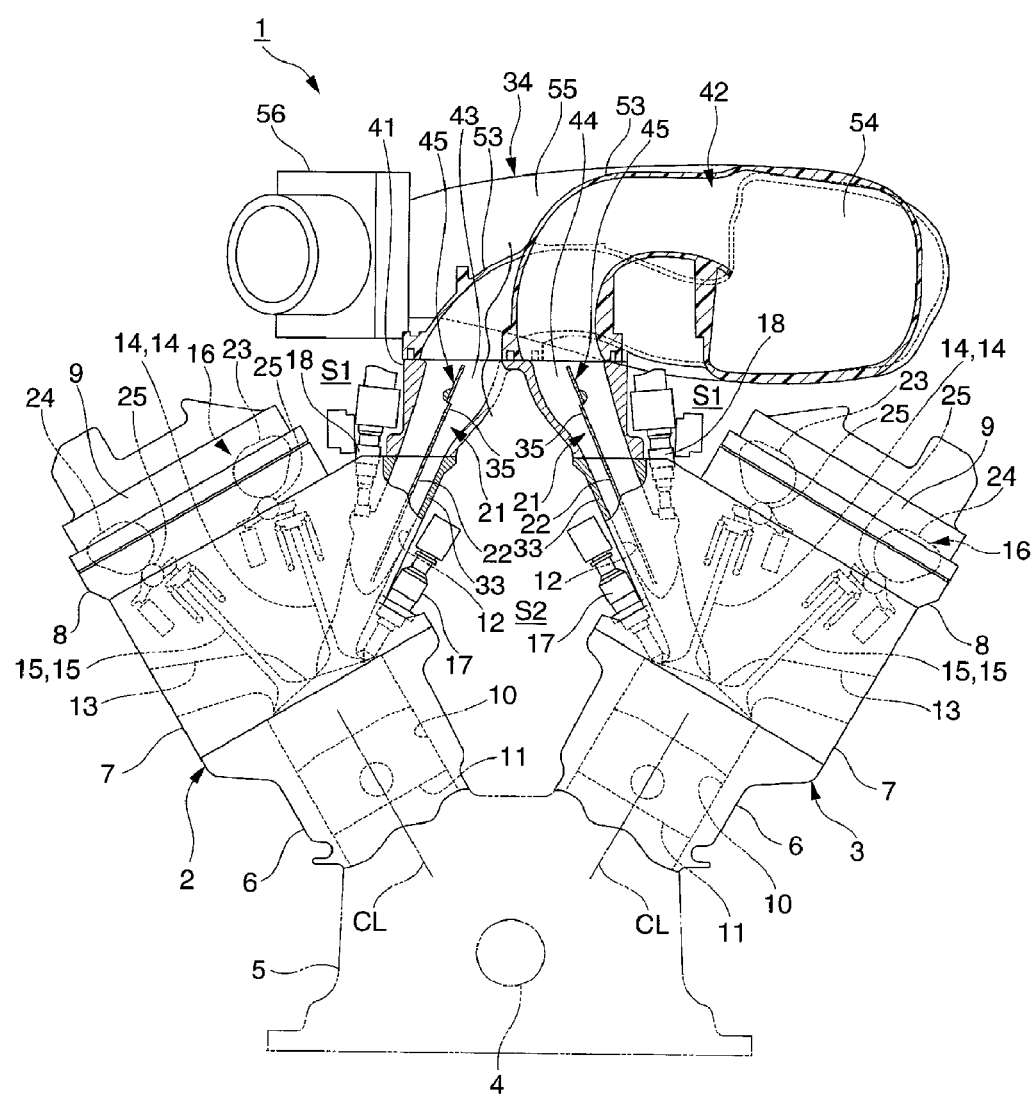
FIG. 1 is a front view of an engine including an intake control device according to a preferred embodiment of the present invention.
Figure 2:
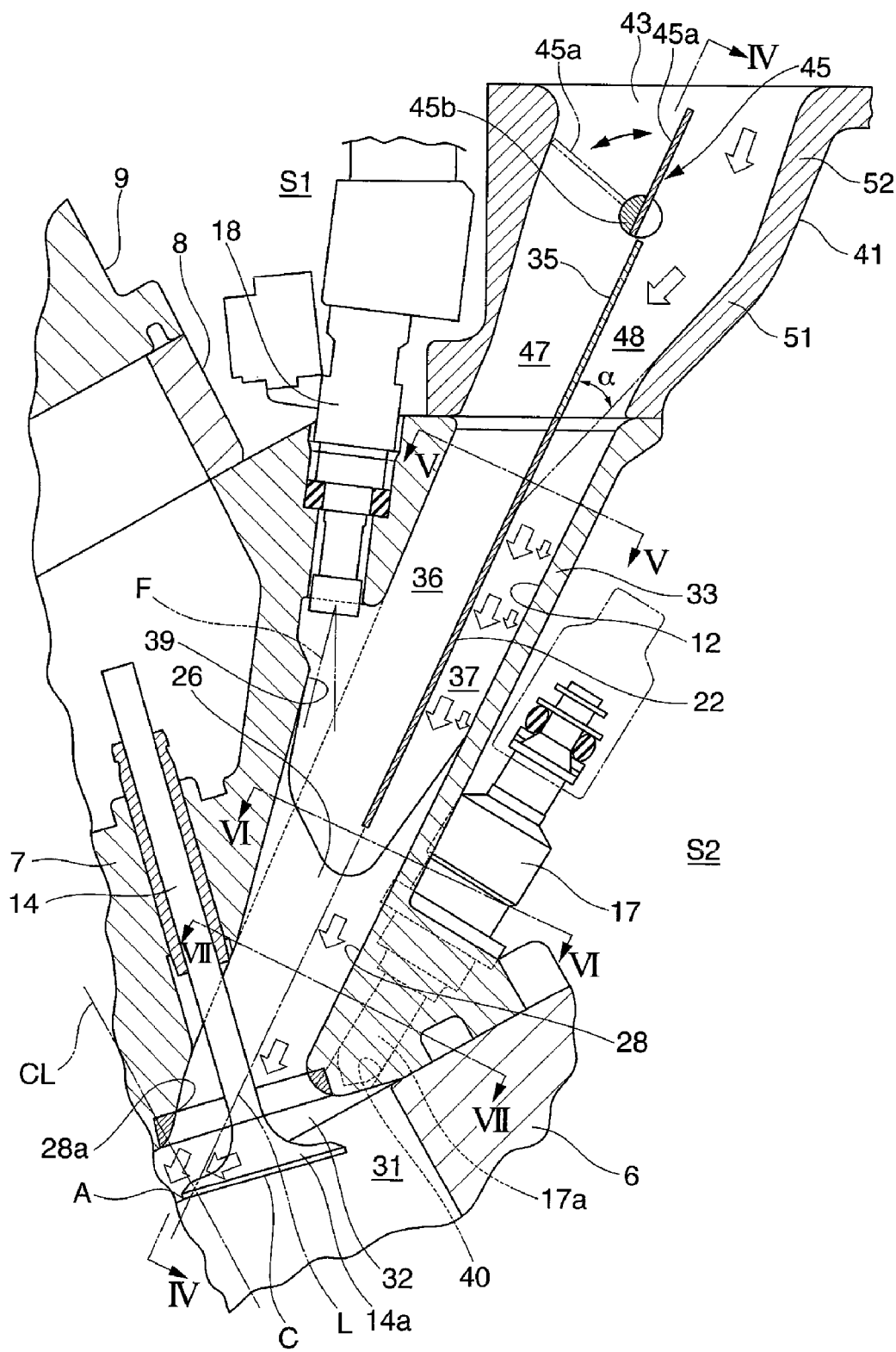
FIG. 2 is an enlarged cross-sectional view showing essential parts of the intake control device.
Figure 3:
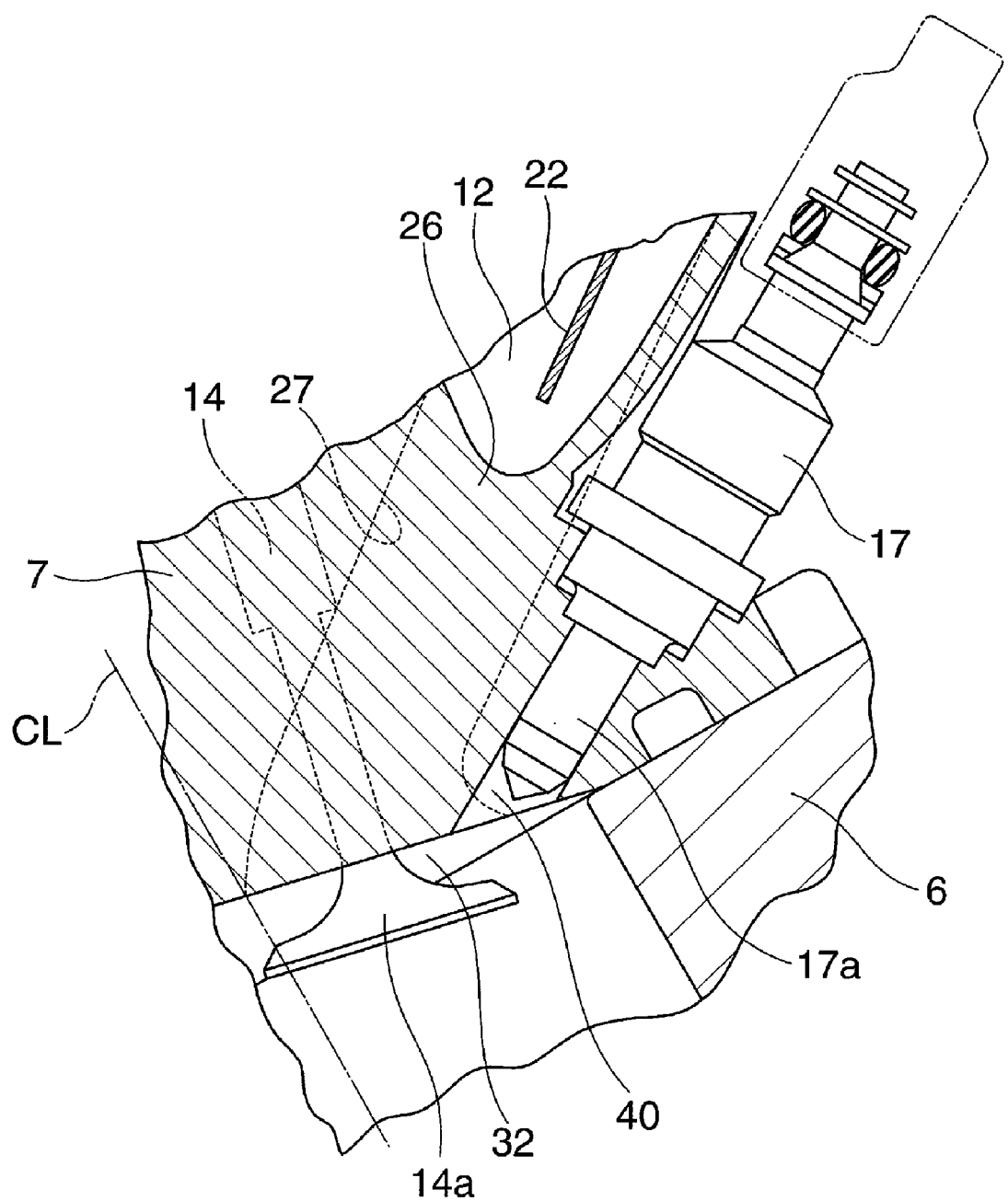
FIG. 3 is an enlarged cross-sectional view showing an attachment part of an in-cylinder injector.
Figure 4:
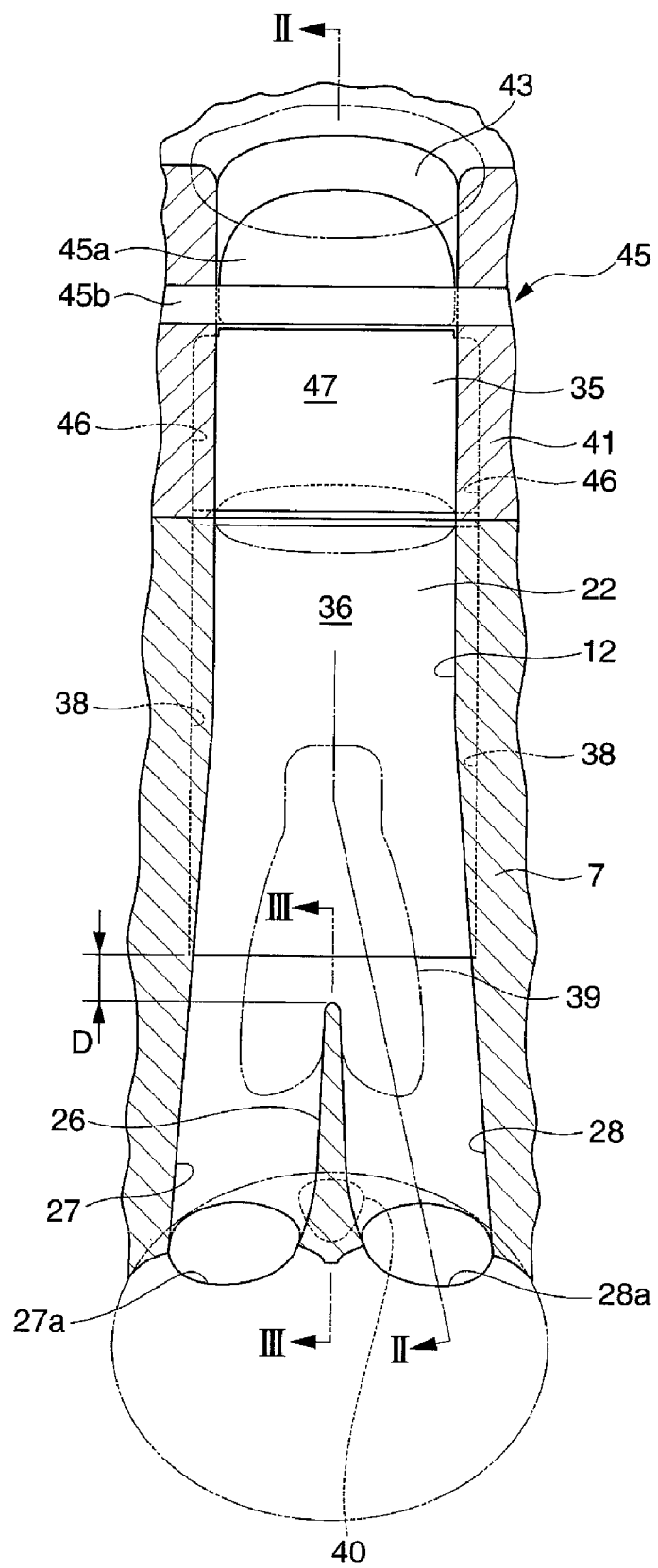
FIG. 4 is a cross-sectional view of an intake passage taken along a line IV-IV in FIG. 2.
Figure 5:
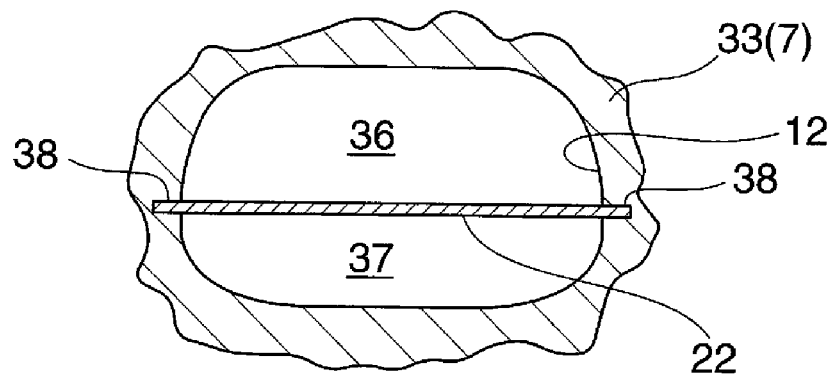
FIG. 5 is a cross-sectional view taken along a line V-V in FIG. 2.
Figure 6:
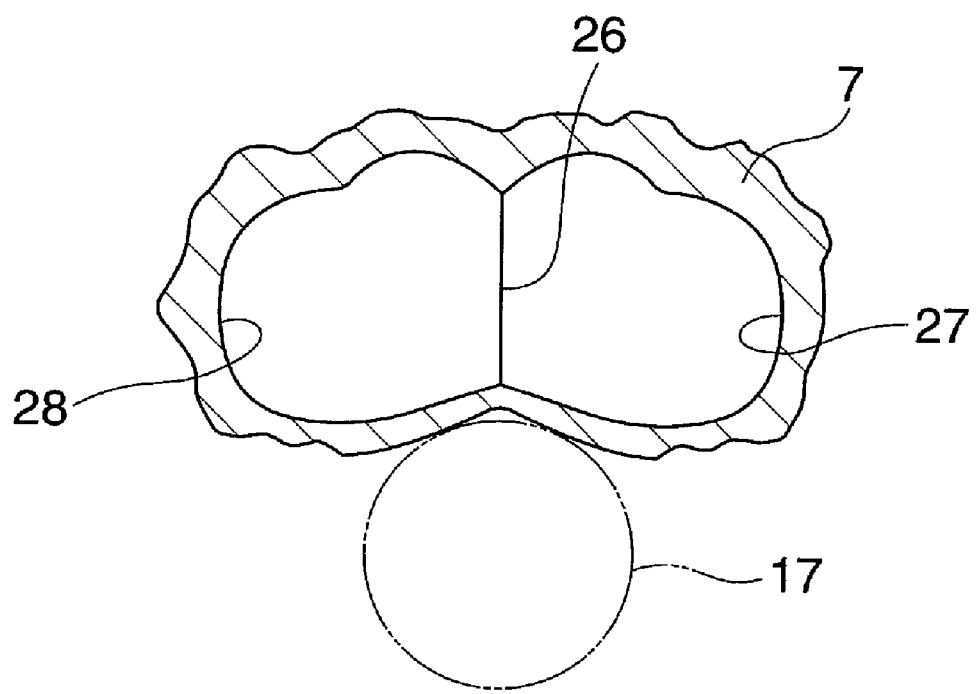
FIG. 6 is a cross-sectional view taken along a line VI-VI in FIG. 2.
Figure 7:
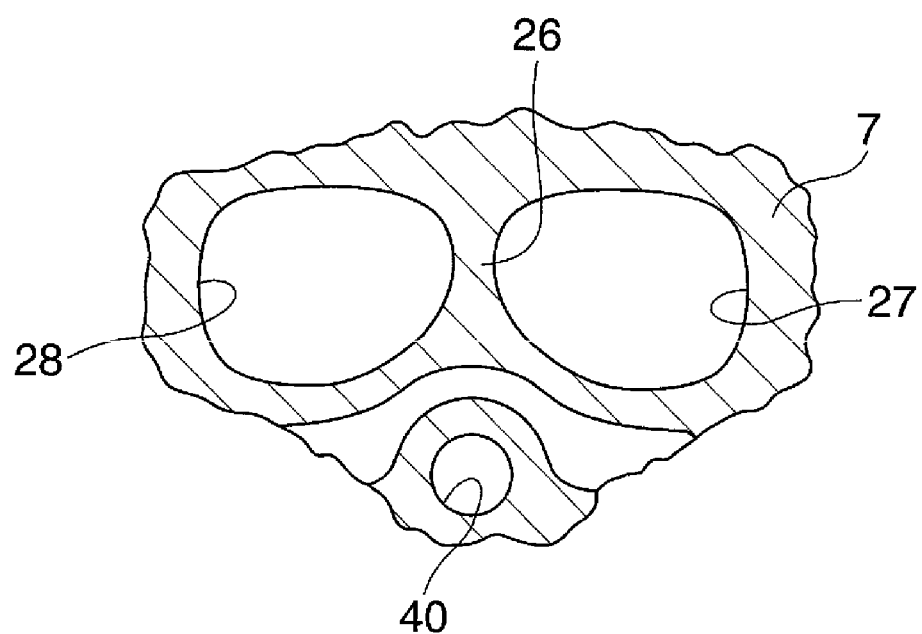
FIG. 7 is a cross-sectional view taken along a line VII-VII in FIG. 2.

FIG. 1 is a front view of the engine including the intake control device according to a preferred embodiment of the present invention. In FIG. 1, an upstream portion of an intake passage is cut away. FIG. 2 is an enlarged cross-sectional view showing essential parts of the intake control device. FIG. 3 is an enlarged cross-sectional view showing an attachment part of an in-cylinder injector. FIG. 4 is a cross-sectional view of the intake passage taken along a line IV-IV in FIG. 2. In FIG. 4, the positions, along which the cross-section of FIG. 2 is taken, are shown by a line II-II, and the positions, along which the cross-section of FIG. 3 is taken, are shown by a line III-III. FIGS. 5 through 7 are cross-sectional views of the intake passage. FIG. 5 is a cross-sectional view taken along a line V-V in FIG. 2. FIG. 6 is a cross-sectional view taken along a line VI-VI in FIG. 2. FIG. 7 is a cross-sectional view taken along a line VII-VII in FIG. 2.

In the drawings, reference numeral 1 denotes an engine for an automobile, for example, according to a preferred embodiment of the present invention. The engine 1 is preferably a V-type six-cylinder engine, and includes a first cylinder line 2 positioned on the left in FIG. 1 and a second cylinder line 3 positioned on the right in FIG. 1. In the present preferred embodiment, as shown in FIG. 1, a side close to each of the cylinder lines between the right and left sides of the cylinder lines 2 and 3, as viewing the engine 1 in the axial direction of a crankshaft 4, is referred to as "the inner side of a V-bank," and the other side is referred to as "the outer side of the V-bank." Since the cylinder lines 2 and 3 have similar constructions, detailed description will be made of the first cylinder line 2 hereinafter. The same reference numerals and symbols will be given to members of the second cylinder line 3, and detailed descriptions thereof will not be made.

The first cylinder line 2 and the second cylinder line 3 have cylinder bodies 6 arranged to protrude from a cylinder block 5 shared by both of the cylinder lines 2 and 3, cylinder heads 7 mounted on the cylinder bodies 6, cam housings 8, and head covers 9 mounted on the cylinder heads 7, and so forth. Three cylinder bores 10 are aligned in the axial direction of the crankshaft 4 on the cylinder body 6. In FIG. 1, a reference numeral 11 denotes a piston fitted into the cylinder bore 10.

The cylinder head 7 includes an intake port 12 and an exhaust port 13, which will be described later, an intake valve 14 and an exhaust valve 15 for opening or closing the ports 12 and 13, a valve operation system 16 for operating the intake and exhaust valves 14 and 15, an in-cylinder injector 17, an intake passage injector 18, and a downstream partition plate 22 defining a portion of an intake control device 21 according to a preferred embodiment of the present invention.

Two intake valves 14 and two exhaust valves 15 are provided on the cylinder head 7 in each of the cylinders. The valve operation system 16 drives the intake valves 14 and the exhaust valves 15 by an intake camshaft 23, an exhaust camshaft 24, and a rocker arm 25 provided on each of the camshafts.

The intake port 12 defines a portion of the intake passage of a preferred embodiment of the present invention, and is arranged on the inner side of the V-bank of the cylinder head 7. As shown in FIGS. 4, 6 and 7, a downstream end of the intake port 12 bifurcates into a first bifurcating port 27 and a second bifurcating port 28, which are partitioned from each other by a partition 26. The first bifurcating port 27 and the second bifurcating port 28 are opened or closed by the two intake valves 14, 14.

As shown in FIG. 2, downstream ends of the first bifurcating port 27 and the second bifurcating port 28 open at an upper wall 32 of a combustion chamber 31 in the cylinder head 7. As shown in FIG. 1, the intake port 12 according to the present preferred embodiment is arranged to linearly extend obliquely upward relative to the axial line CL of the cylinder from the opening at the downstream end.

An upstream portion of the intake port 12 includes an intake pipe connection portion 33 arranged to protrude toward the other cylinder line at an end of the cylinder head 7 on the inner side of the V-bank. An upper end of the intake pipe connection portion 33 preferably has a generally horizontal flat surface. An intake manifold 34 described below (see FIG. 1) is mounted thereon.

As shown in FIGS. 1 and 2, the downstream partition plate 22 is provided in the intake port 12. The downstream partition plate 22 defines the partition plate in the present preferred embodiment together with an upstream partition plate 35 close to the intake manifold 34, which will be described below. The downstream partition plate 22 is preferably made of an aluminum alloy as a body separate from the cylinder head 7, and is arranged to partition the intake port 12 into an upper intake passage 36 and a lower intake passage 37. As shown in FIG. 5, the downstream partition plate 22 is positioned generally at a vertical center of the intake port 12 as viewed from upstream along an inside of the intake port 12.

Both edges (both right and left edges in FIG. 5) of the downstream partition plate 22 are fitted in guide grooves 38 (see FIG. 4 and 5) provided on an inner wall surface of the intake port 12, and thereby support the downstream partition plate 22. The guide grooves 38 are arranged to extend in a direction that intake air flows from an opening at an upstream end of the intake port 12 (an upper end of the intake pipe connection portion 33) to the vicinities of upstream portions of the partition 26. That is, the downstream partition plate 22 is inserted to fit in the guide grooves 38 from the upstream end of the intake port 12 into the vicinity of the upstream portion of the partition 26, and retained there to be substantially parallel to the intake port 12 as seen along the axial direction of the crankshaft 4. As shown in FIG. 4, in the present preferred embodiment, the downstream partition plate 22 has a length such that it is separated from the upstream side of the partition 26 by a length D.

Further, as shown in FIG. 2, the downstream partition plate 22 is inclined such that an extension line L from the downstream partition plate 22 toward the combustion chamber 31 passes between a valve surface center C of a valve disc 14a of the intake valve 14 (the center of a lower surface of the valve disc 14a) and an edge A of the lower surface of the valve disc 14a, which is positioned close to the center of the combustion chamber 31, as seen along the axial direction of the crankshaft 4.

The intake passage injector 18 is provided in an upper portion of the intake port 12, and the in-cylinder injector 17 is provided in a lower portion thereof.

The intake passage injector 18 is mounted on a portion between an upper end of the intake pipe connection portion 33, on which the intake manifold 34 is mounted, and an upper end of the cylinder head 7 (the cam housing 8). In other words, the intake passage injector 18 is positioned in a space S1 between the upper end of the cylinder head 7 and the intake manifold 34.

As shown in FIGS. 2 and 4, the intake passage injector 18 injects fuel F into an injector connection portion 39 arranged such that an upper wall portion of the intake port 12 opens upward. The intake passage injector 18 injects fuel F into each of the first bifurcating port 27 and the second bifurcating port 28 through the injector connection portion 39. The intake passage injector 18 according to the present preferred embodiment mainly supplies fuel when operation of the engine 1 is in a low or medium operation range.

The in-cylinder injector 17 is mounted at a lower end of the cylinder head 7, which is also an end on the inner side of the V-bank. In other words, the in-cylinder injector 17 is provided in an inner space S2 between the intake port 12 of the first cylinder line 2 and the intake port 12 of the second cylinder line 3. In the present preferred embodiment, as shown in FIGS. 1 and 2, the in-cylinder injector 17 is mounted in the cylinder head 7 such that it is positioned in a lower portion of the intake port 12 and extends substantially parallel with the intake port 12 as seen along the axial direction of the crankshaft 4. As shown in FIGS. 3 and 7, the in-cylinder injector 17 is positioned in a vicinity of a lower portion of the partition 26 for partitioning the first bifurcating port 27 and the second bifurcating port 28 from each other.

As shown in FIGS. 3 and 4, a fuel injecting portion 17a of the in-cylinder injector 17 is inserted into a fuel injection port 40 provided in the upper wall 32 of the combustion chamber 31 to be positioned between openings 27a and 28a at the downstream ends of the first bifurcating port 27 and the second bifurcating port 28. The in-cylinder injector 17 mainly supplies fuel when operation of the engine 1 is in a high speed and high load operation range. An injection timing of the in-cylinder injector 17 is set in a manner such that fuel is injected during an intake stroke.

The exhaust port 13 is positioned on the outer side of the V-bank of the cylinder head 7, and bifurcates similarly to the intake port 12. An exhaust device (not shown) is connected to an exhaust exit of the exhaust port 13.

As shown in FIG. 1, the intake manifold 34 is provided with an auxiliary intake manifold 41 fixedly placed on the intake pipe connection portion 33 and a main intake manifold 42 removably mounted on an upper end of the auxiliary intake manifold 41. Hereinafter, a position vicinal to the intake manifold 34 will be simply referred as "the intake manifold side."

The auxiliary intake manifold 41 is preferably arranged into a prescribed shape from aluminum alloy by casting. As shown in FIG. 1, in the auxiliary intake manifold 41, an intake passage 43 for the intake manifold side of each of the cylinders, which connects to the intake port 12 of the first cylinder line 2, is provided on one side thereof. An intake passage 44 for the intake manifold side of each of the cylinders, which connects to the intake port 12 of the second cylinder line 3, is provided on the other side. The intake passage extending obliquely upward from the combustion chamber in the present preferred embodiment is provided with intake passages 43 and 44 for the intake manifold side, which are provided in the auxiliary intake manifold 41 and in the intake ports 12. The intake passages 43 and 44 for the intake manifold side are arranged in shapes such that the intake ports 12 extend obliquely upward.

The downstream partition plates 22 in the intake ports 12, the upstream partition plates 35, which define the partition plates in the present preferred embodiment, and the tumble control valves 45 are provided in the auxiliary intake manifold 41.

The upstream partition plate 35 is preferably made from an aluminum alloy into a body separate from the auxiliary intake manifold 41. As shown in FIG. 2, the upstream partition plate 35 is provided in a position such that the downstream partition plate 22 extends obliquely upward, as seen along the axial direction of the crankshaft 4, at an angle the same as the downstream partition plate 22.

The upstream partition plate 35 is supported by the auxiliary intake manifold 41 with a supporting structure the same as the supporting structure of the downstream partition plate 22. That is, both edges of the upstream partition plate 35 are fitted in guide grooves 46 (see FIG. 4) provided on an inner wall of the intake passage of the auxiliary intake manifold 41, and thereby the upstream partition plate 35 is retained in the auxiliary intake manifold 41. The upstream partition plate 35 according to the present preferred embodiment is provided in a position such that it partitions the intake passages 43 and 44 for the intake manifold side into an upper intake passage 47 and a lower intake passage 48 as seen along the axial direction of the crankshaft 4.

The upstream partition plate 35 extends from a lower end of the auxiliary intake manifold 41 to a portion which is slightly upward from the vertical center portion of the auxiliary intake manifold 41. A lower end of the upstream partition plate 35 contacts with an upper end of the downstream partition plate 22 over its entire width to prevent communication between the upper intake passages 47 and 36 with the lower intake passages 48 and 37 in a connection portion between the partition plates 22 and 35.

The tumble control valve 45 is preferably a butterfly valve for opening or closing a portion of the intake passages 43 and 44 for the intake manifold side in the auxiliary intake manifold 41, and provided in a vicinity of an upstream portion of the upstream partition plate 35 in the auxiliary intake manifold 41. The intake control device 21 in the present preferred embodiment includes the auxiliary intake manifold 41 having the tumble control valve 45, the downstream partition plate 22, and the upstream partition plate 35.

The valve disc 45a of the tumble control valve 45 is supported by a valve shaft 45b extending in the axial direction of the crankshaft 4, and rotates between an open position shown by the solid line in FIG. 2 and a closed position shown by the chain double-dashed line in FIG. 2 due to a rotation of the valve shaft 45b.

As shown in FIG. 4, the valve disc 45a is preferably a disc in a shape the same as cross-sections of upper half portions of the intake passages 43 and 44 for the intake manifold side. The valve disc 45a becomes parallel to a flowing direction of intake air when it rotates to the open position, and closes the upstream end of the upper intake passage 47 when it rotates to the closed position.

The valve shaft 45b passes through the auxiliary intake manifold 41 in the axial direction of the crankshaft 4, and is shared by tumble control valves 45 of other adjoining cylinders (not shown). The valve shaft 45b is connected to a motor (not shown), and operated at a prescribed period. The tumble control valve 45 according to the present preferred embodiment closes when operation of the engine 1 is in a low speed and low load operation range, and opens in other operation ranges.

The upper intake passage 47 and the lower intake passage 48 provided in the auxiliary intake manifold 41 are arranged such that the tumble control valves 45 are positioned in vicinities of their inlets.

As shown in FIG. 2, a bottom wall 51, which is a portion of a wall around the inlet of the lower intake passage 48 and positioned on the side opposite to the upstream partition plate 35, is inclined to be gradually separated from the upstream partition plate 35 as it extends upward. In the present preferred embodiment, an angle α (see FIG. 2) of the bottom wall 51 relative to the upstream partition plate 35 is preferably between approximately 25° and approximately 30°. An upstream end of the inclined bottom wall 51 is connected to a straight portion 52 extending downward substantially parallel with the upstream partition plate 35 from an upstream end of the auxiliary intake manifold 41.

As shown in FIG. 1, the main intake manifold 42 connected to the upstream end of the auxiliary intake manifold 41 is provided with pipe portions 53 connected to the intake passages 43 and 44 for the intake manifold side of the auxiliary intake manifold 41, and a surge tank 54 provided at upstream ends of the pipe portions 53. Preferably, three separate plastic portions are assembled by oscillation welding, for example, and thereby the main intake manifold 42 according to the present preferred embodiment is formed in a prescribed shape.

As shown in FIG. 1, the pipe portions 53 extend from the auxiliary intake manifold 41 to portions above the second cylinder line 3. Therefore, a portion above the space S1, where the intake passage injector 18 of the second cylinder line 3 is located, is covered by the pipe portion 53.

As shown in FIG. 1, the surge tank 54 is disposed above the head cover 9 of the second cylinder line 3. An air inlet pipe 55 extending toward the first cylinder line 2 is provided at an end of the surge tank 54 in the axial direction of the crankshaft 4. An end portion of the air inlet pipe 55 is positioned above the first cylinder line 2. A throttle valve 56 is provided on the end portion.

Air passed through the throttle valve 56 passes through the air inlet pipe 55, the surge tank 54, the pipe portions 53, the intake passages 43 and 44 for the intake manifold side, and the intake ports 12 to flow into the combustion chambers 31.

In the engine 1 including the intake control device 21 as described above, in the case that the tumble control valve 45 is closed, intake air flows only into the lower intake passage 48 in the auxiliary intake manifold 41. In the lower intake passage 48, the bottom wall 51 around its inlet is inclined to be gradually separated from the upstream partition plate 35 as it extends upward. Thus, the inlet is wide and an inflow of intake air is facilitated.

Intake air flowing around the bottom wall 51 hits the bottom wall 51, thereby changing its flow direction, and the intake air flows toward the upstream partition plate 35 as shown by the arrows in FIG. 2. At this point, the bottom wall 51 around the inlet of the lower intake passage 48 substantially functions as an air funnel, and thereby intake air smoothly flows from an inside of the auxiliary intake manifold 41 into the intake port 12.

Therefore, with the intake control device 21 according to the present preferred embodiment, by including the upstream partition plate 35 and the downstream partition plate 22 in the intake passage in the intake port 12 and the auxiliary intake manifold 41, a flow coefficient of intake air in a state that the tumble control valve 45 is closed can be relatively larger than in the conventional intake control device.

As a result of having a large flow coefficient of intake air as mentioned above, in the intake control device 21, if the tumble control valve 45 is closed, a large amount of intake air can flow along the upstream partition plate 35 and the downstream partition plate 22 around the partition plates 22 and 35 in the lower intake passage in the auxiliary intake manifold 41 and the intake port 12.

The intake air passes through the downstream openings 27a and 28a of the intake port 12 (exits of the intake passage) and the intake valve 14 as seen along the axial direction of the crankshaft 4, and flows obliquely into the cylinder while the intake air concentrates around the upstream partition plate 35 and the downstream partition plate 22. In other words, a large amount of intake air flows around the center portion of the intake passage provided with the upper intake passages 36 and 47 and the lower intake passages 37 and 48. A flowing direction of intake air in this case is shown by the arrows in FIG. 2.

Therefore, with the intake control device 21 according to the present preferred embodiment, without using a moving flow straightening member linked with the tumble control valve, intake air can be passed into the cylinder such that it passes through the center of the combustion chamber 31 as seen along the axial direction of the cylinder. Because the intake air flows into the cylinder in such a manner, the intake air does not directly hit an end of a bore wall surface of the cylinder bore 10 around the cylinder head 7. Therefore, a flowing direction and a flow speed of intake air are retained as long as possible. That is, with the intake control device according to the present preferred embodiment, intake air flows obliquely into the cylinder such that it collects around the axis of the cylinder, and thereby an effective tumbling flow is generated in the cylinder.

Meanwhile, if the tumble control valve 45 is opened, intake air flows into the upper intake passage 47 of the auxiliary intake manifold 41, a large amount of intake air flows into the cylinder passing through both the upper intake passages 36 and 47 and the lower intake passages 37 and 48 of the auxiliary intake manifold 41 and the intake port 12, and thereby a large output can be obtained from the engine 1.

Accordingly, in the engine 1 including the intake control device 21 according to the present preferred embodiment, an effective tumbling flow is generated by closing the tumble control valve 45, whereby an improvement in fuel efficiency and purification of exhaust gas are facilitated. Also, the engine 1 can have a high speed and high load operation by opening the tumble control valve 45.

The downstream partition plate 22 according to the present preferred embodiment is inclined such that an extension line L from the downstream partition plate 22 toward the combustion chamber 31 passes between the valve face center C of the intake valve 14 and the edge A of the lower surface of the valve disc 14a, which is positioned close to the center of the combustion chamber 31. Therefore, in the intake control device 21 with such a construction, intake air flows into the cylinder through the lower intake passages 37 and 48 in a state that the tumble control valve 45 is closed, and a portion of the intake air, which hits the valve disc 14a of the intake valve 14, flows in a direction opposite to the intake port 12 as seen along the axial direction of the crankshaft 4 as shown by the arrows in FIG. 2. Accordingly, intake air hits the valve disc 14a of the intake valve 14, whereby intake air is prevented from flowing in the direction that a tumbling flow is weakened, and thus an effective tumbling flow can be further generated.

In the foregoing preferred embodiments, description is made with respect to an example in which "the intake passage extending obliquely upward from the combustion chamber" is provided with the intake port 12 and the auxiliary intake manifold 41. However, the present invention is not limited to this case, but the intake passage can include only the intake port 12. In such a case, the tumble control valve 45 is mounted in the cylinder head 7.

In the above preferred embodiments, description is made with respect to an example in which one cylinder includes the in-cylinder injector 17 and the intake passage injector 18. However, the cylinder can include only either one of the injector 17 or 18.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An intake control device for an engine, comprising:
   an intake manifold including a main intake manifold and an auxiliary intake manifold, the main intake manifold removably mounted to an upper end of the auxiliary intake manifold, and the auxiliary intake manifold removably mounted to an upper end of a cylinder head;
   a partition plate provided in an intake passage extending obliquely upward from a combustion chamber, as seen along an axial direction of a crankshaft, arranged to divide the intake passage into an upper intake passage and a lower intake passage, the partition plate including an upstream partition plate and a downstream partition plate; and
   a tumble control valve provided in a vicinity of the upstream partition plate in the upper intake passage and arranged to open or close at least a portion of the upper intake passage; wherein
   a bottom wall arranged at an inlet of the lower intake passage is inclined at an angle α between approximately 25° to approximately 30° and spaced away from the upstream partition plate by a gradually increasing distance as the bottom wall extends upstream in the lower intake passage;
   a portion of the lower intake passage located downstream from the bottom wall extends parallel or substantially parallel to the downstream partition plate;
   a portion of the lower intake passage located upstream from the bottom wall extends parallel or substantially parallel to the upstream partition plate;
   when the tumble control valve is closed, intake air changes direction such that the intake air contacts the bottom wall and is directed towards the partition plate; and
   the upstream partition plate, the tumble control valve, and the bottom wall are arranged within the auxiliary intake manifold.

2. The intake control device for an engine according to claim 1, wherein the partition plate is inclined such that an extension line from the partition plate toward the combustion chamber passes between a center of a lower surface of a valve disc of an intake valve and an edge of a lower surface of the valve disc, which is positioned close to the center of the combustion chamber.

3. The intake control device for an engine according to claim 1, wherein the partition plate is immovably fixed within the intake passage.

4. The intake control device for an engine according to claim 1, wherein each of the upstream partition plate and the downstream partition plate is straight.

5. The intake control device for an engine according to claim 1, wherein the portion of the lower intake passage located upstream from the bottom wall is wider than the portion of the lower intake passage located downstream from the bottom wall.

\* \* \* \* \*